Sept. 8, 1959 J. M. CRAIGO ET AL 2,902,769
DENTURE MAKING APPLIANCE
Filed Feb. 21, 1958
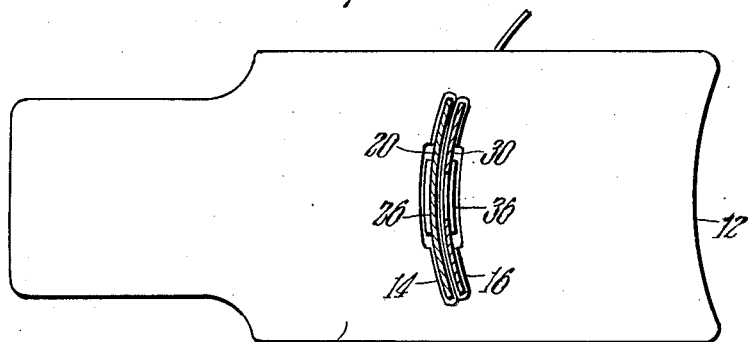
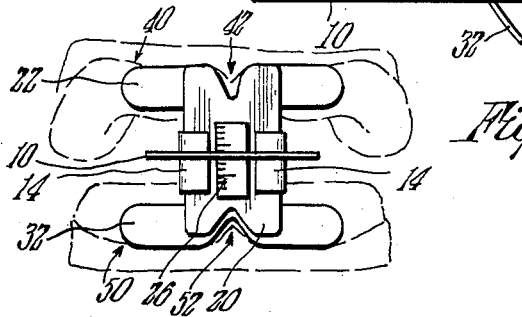
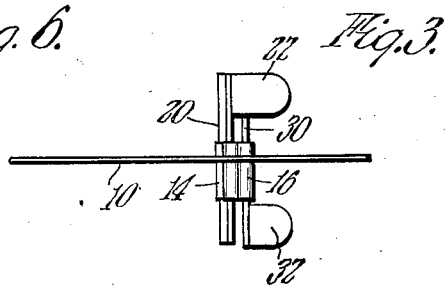
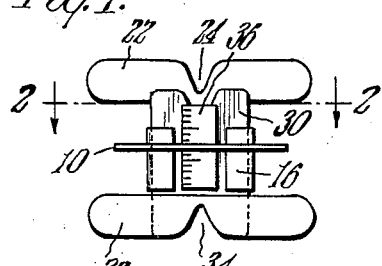
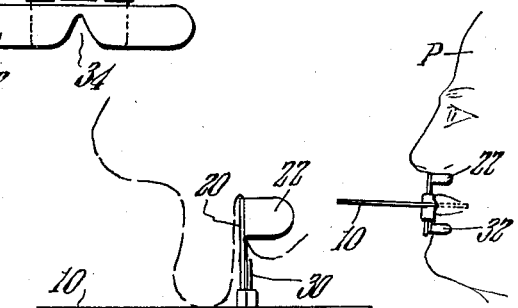
INVENTOR.
John M. Craigo
BY Helen E. Craigo

United States Patent Office 2,902,769
Patented Sept. 8, 1959

2,902,769

DENTURE MAKING APPLIANCE

John M. Craigo and Helen E. Craigo,
Thompsonville, Conn.

Application February 21, 1958, Serial No. 716,701

6 Claims. (Cl. 33—174)

This invention relates to new and useful improvements in a method of an apparatus for measuring the vertical dimensions of the upper and lower dental arches of an edentilious person, which intelligence can be employed in the making of dental plates for said person.

One of the objects of the invention is to provide a method and means for practising the method which eliminates considerable of the guess work of the dentist in providing dentures which dimensionally and otherwise are as nearly as possible like the natural teeth which they replace. To attain this end, the invention comprehends the provision of a unique method of measuring and a novel, simple and inexpensive instrument through the medium of which the vertical dimensions, both extra-oral and intra-oral, of the upper and lower dental arches may be readily ascertained.

More specifically stated, to determine the height to which the upper and/or occlusion rims of dental plates must be built, it is essential that the dentist or dental technician have an accurate dimension for the vertical height of the upper and/or lower dental arches, all to the end that the dental plate or plates may be so shaped and formed as to insure the preservation of the most desirable and natural contour of the lips, cheeks and other soft tissues.

By the method and means hereof, such measurements can be taken exteriorly or interiorly of the mouth.

When taken exteriorly, the upper vertical dimension is considered to be the distance, measured by means of the device hereof, from the point on the upper lip immediately adjacent the nostrils of the patient's nose to the bottom of the upper lip when the patient's lips are in the natural, undistorted, normally closed relation. The lower vertical dimension is considered to be the distance from the normal breaking or fold line (approximately half-way between the top of the lower lip and the chin) to the top of the lower lip when the patient's lips are in the said natural, undistorted, normally closed relation.

When taken interiorly, the upper vertical dimension may be considered to be a distance from the depth of the mucco-labial fold adjacent the labial frenum, and the lower vertical dimension may be considered to be a distance from the depth of the mucco-labial fold adjacent the lower labial frenum.

With the foregoing and other objects in view, the invention consists of the construction, combination and arrangement of parts hereinafter fully described and claimed and illustrated in the accompanying drawing wherein:

Fig. 1 is a rear end elevational view of the instrument of the invention;

Fig. 2 is a large scale sectional view on the line 2—2 of Fig. 1;

Fig. 3 is a side elevational view of the instrument of the invention;

Fig. 4 is a small scale side elevational view of the instrument, showing, in dash lines, a portion of a patient's head, with the extra-oral measurements being taken;

Fig. 5 is a side elevational view of the instrument, showing, in dash lines, a portion of a patient's mouth, with the intra-oral measurements being taken; and Fig. 6 is a front end fragmentary elevational view of the instrument shown in Fig. 1 showing, in dash lines, a portion of the labial frenum and a portion of the lower labial frenum in a patient's mouth with the intra-oral measurements being taken.

The instrument forming the subject matter of the present invention can be first explained by a more or less general description of the technique of which it forms a part.

It may be assumed, as an example, that a dental technician in his laboratory, possibly remote from the office of the dentist, is assisting in the preparation or fabrication of the dental plates for a patient in accordance with measurements and other instructions obtained and supplied to him by the dentist as the result of his examination of said patient's mouth.

Certain of these essential measurements are more conveniently and accurately determined by the apparatus of this invention.

The instrument comprises a horizontally disposed plate member 10 which I define, for purposes of definition, as a labial horizontal plate.

The rearwardly extending mouth-insertion portion thereof (the right hand portion as viewed in Fig. 2) is adapted to be receivable in the mouth or oral cavity of the patient and the end edge 12 thereof may be, if desired, slightly concaved so as to be more comfortably received adjacent the tongue of the patient.

The forwardly extending manually-engageable portion thereof (the left hand portion as viewed in Fig. 2) is adapted to be manually engaged by the dentist as he prepares to use the instrument by inserting the mouth-insertion portion thereof into the patient's mouth. By such manual manipulation, the dentist is enabled to insure that same is disposed substantially horizontally at the desired angle relative to the patient's head.

The plate 10 is of such dimensions as to be comfortably receivable within the patient's oral cavity when in use, so as to avoid gagging, and to permit the closing of the mouth therearound with the lips of the mouth assuming a normally closed, undistorted relation and softly abutting the upper and lower surfaces thereof, all as will hereinafter appear.

The plate 10 is provided with a slightly curved transverse slot extending therethrough into which a pair of adjacent arcuate guides or slideways 14 and 16 are disposed in a back-to-back relation with upper portions thereof extending upwardly above the top surface of the plate and with lower portions extending downwardly below the lower surface thereof, as may be appreciated by reference to Figs. 1, 3 and/or 6.

An uppermost, vertically extending, supporting member consists of a main vertical support portion 20 and a horizontally disposed, arcuately shaped, superior labial frenum bar 22 may be fixed thereto so as to be integral therewith. The bar 22 extends transversely relative to the longitudinal axis of the support portion 20 and extends outwardly therefrom at both sides of the upper end portion thereof.

The support portion 20 is transversely curved, as shown, so as to be slidably receivable within the guideway 14 and to be adjustable vertically relative thereto due to its frictional contact therewith, all to prevent its accidental movement therein.

The superior labial frenum bar 22 is of arcuate configuration and is so suitably curved as to be of such shape as to be virtually complementary to the facial structures of the upper lip and to be comfortably placeable adjacent the exterior facial structures of the upper lip with the upper edge of said superior labial frenum bar just touching the wings of the nostrils of the nose when an extra-oral measurement is desired and/or as to comfortably embrace the structure of the mucco-labial fold adjacent the labial frenum when an intra-oral measurement is desired.

The upper edge of the superior labial frenum bar 22 is provided at the midpoint thereof with a V notch 24 which serves as a check means whereby the instrument may be centered relative to the nostrils of the nose of the patient when an extra-oral measurement is taken or to the labial frenum when an intra-oral measurement is taken.

The support 20 is provided with a scale 26 whereby the distance from the upper edge of the superior labial frenum bar 22 to the upper surface of the plate member 10 may be easily and readily determined following the desired adjustment of the relative parts.

A lowermost, vertical extending, supporting member consists of a vertical support 30 and a horizontally disposed, arcuately shaped, inferior labial frenum bar 32 may be fixed thereto so as to be integral therewith. The bar 32 extends transversely relative to the longitudinal axis of the support portion 30 and extends outwardly therefrom at both sides of said portion as shown.

The support 30 is transversely curved, as shown, so as to be slidably receivable within the guideway 16 and to be adjustable vertically relative thereto due to its frictional contact therewith, all to prevent its accidental movement therein.

The inferior labial frenum bar 32 is of arcuate configuration and is so suitably curved as to be of a shape complemental to the facial structures of the lower lip and to embrace the exterior facial structures of the lower lip immediately adjacent the normal breaking or natural fold line of the lower lip (intermediate the top of the lower lip and the chin) when an extra-oral measurement is desired and/or as to embrace the structure of the mucco-labial fold adjacent the lower labial frenum when an intra-oral measurement is desired.

The lower edge of the inferior labial frenum bar 32 is provided at the midpoint thereof with a V notch 34 which serves as a check means whereby the instrument may be centered relative to the fold line of the patient when an extra-oral measurement is taken or to the lower labial frenum when an intra-oral measurement is taken.

The support 30 is provided with a scale 36 whereby the distance from the lower edge of the inferior labial frenum bar 32 to the lower surface of the plate member 10 may be easily and readily determined following the desired adjustment of the relative parts.

That is to say, the support members 20 and 30 respectively extend in opposite directions from the plate member 10 and are separately and relatively adjustable relative thereto. If desired, same may be used separately, each with the plate member 10, when only an upper or lower vertical dimension, as the case may be, is desired to be ascertained.

The instrument may be termed a verter meter, and is adapted to be used by placement against the high lip line and the low lip line of the patient, during conditions of a normal closed position of the lips of the patient, in measuring the vertical distances between the nostrils of the nose and the plate member 10 and between the fold line between the lower lip and chin and the plate member 10 in the case of extra-oral measurements. As shown in Fig. 4, the upper edge of the superior labial frenum bar 22 is pressed rather lightly against the upper lip immediately below the nose and the lower edge of the inferior labial frenum bar 37 is pressed rather lightly against the horizontal line between the lower lip and the chin of the patient P, one or both of the bars 22 and 32 being slidably adjustable on their respective support members 20 and 30 relative to the plate member 10 which is held between the normally closed lips of the patient in a substantially horizontally disposed position.

The upper extra-oral measurement is ascertained by measuring the distance from the upper surface of the plate 10 with the upper lip in abutment therewith to the point adjacent the bottom of the nose, the support member 20 being adjusted relative to the plate member 10 until it is in contact with the lip.

The lower extra-oral measurement is ascertained by measuring the distance between the lower lip and the horizontal fold line between the lower lip and the chin, and this is accomplished by holding the bar 32 against the horizontal fold line between the lower lip and the chin, and is taken as the distance from the lower surface of the plate 10 with the lower lip in abutment therewith to the point adjacent the fold line, the support member 30 being adjusted relative to the plate member 10 until it is in contact with the lower lip.

When the upper intra-oral measurement is taken, as shown in Figs. 5 and 6, the superior labial frenum bar 22 may be pressed rather lightly against the depth of the mucco-labial fold 40 of the patient's mouth with the V notch 24 being centered relative to the labial frenum 42. The lips of the patient are placed in the normally closed relation on both sides of the plate member 10. The support member 20 is adjusted relative to the plate member 10 until the desired adjustment is attained and the distance between the top edge of the bar 22 and the plate 10 can subsequently be determined on the scale 26.

Likewise, when the lower intra-oral measurement is taken, the inferior labial frenum bar 32 may be pressed rather lightly against the depth of the lower mucco-labial fold 50 of the patient's mouth with the V notch 34 being centered relative to the lower labial frenum 52. The lips of the patient are agin placed in the normally closed relation on both sides of the plate member 10. The support member 30 is adjusted relative to the plate member 10 until the desired adjustment is attained and the distance between the bottom edge of the bar 32 and the plate 10 can subsequently be determined on the scale 36.

It is to be further understood that, if desired, one or the other of the uppermost and lowermost vertically extending plate members may be removed from the instrument whereby said instrument may be used to measure only the vertical dimension of the upper or lower dental arch, as the case may be.

Understandably, the uppermost supporting member 20 and superior labial frenum bar 22 could be used for its measuring function without being associated with the plate 10. Likewise the lowermost supporting member 30 and inferior labial frenum bar 32 could be used for its measuring function without being associated with the plate 10. Obviously, however, for purposes of convenience and ease of operation, the use of the plate 10 is preferred.

Also, if desired, the supporting members 20 and/or 30 may be provided with a representation of the anterior teeth of the patient which can be mounted on a backing or the like, which backing can be clipped to the respective supporting member 20 or 30 in such manner that the cutting edges of the teeth rest on the labial plate 10, all whereby the operator and the patient can more easily visualize the esthetics of the denture and the operator can more easily determine the correct dimension of the teeth to be used before the dentures are finished.

We claim:
1. A device of the character described comprising, an elongated relatively thin flat labial plate having a forward end portion and a rear end portion for inserting horizontally into the oral cavity of a patient with the lips of the patient embracing said rear end portion in the normal manner, separate guideways intermediate the ends of said plate having relatively thin upper and lower elongated supports independently slidable therein, said guide- ways and supports being arranged vertically relative to the horizontal position of said plate and adapted for disposition in the oral cavity of a patient inwardly of the lips thereof, a superior labial frenum bar and an inferior labial frenum bar carried by upper and lower ends of said upper and lower supports each having opposite ends extending laterally outwardly from opposite sides of said supports, said frenum bars being arcuate to approximate the upper and lower mucco-labial folds of the patient and provided with notches on upper and lower edges thereof respectively to receive the labial frenums of the patient, said supports being provided with scales registrable with said plate for determining measurements between upper and lower sides of said bars and plate.

2. A measuring device of the character described comprising, an elongated relatively thin and flat plate having a forward outer end and a rear inner end for inserting horizontally in the oral cavity of a patient with the lips of the patient naturally embracing upper and lower sides of said plates, guideways between outer and inner ends of said plate extending vertically relative to said plate in horizontal position thereof, upper and lower elongated relatively thin supports frictionally held in said guideways for independent slidable adjusting movements, a superior labial frenum bar and an inferior labial frenum bar on upper and lower ends of said upper and lower supports each having opposite ends extending horizontally outwardly from said supports, said upper support and said superior frenum bar being arcuate to approximate the exterior curvature of the upper lip and the lower support and inferior frenum bar being arcuate to approximate the exterior curvature of the lower lip of a patient when the device is used for extra-oral measurement, said supports and bars being substantially complemental to the mucco-labial folds adjacent the upper and lower frenums when said supports and bars are disposed in the oral cavity of the patient for intra-oral measurements, said bars provided with notches for receiving upper and lower frenums of a patient and for centering said device laterally, and said supports provided with scales registrable with said plate for indicating dimensions from outermost horizontal edges of said bars and plate.

3. A method of intra-orally determining the upper and lower dental arches of a patient including the steps of, introducing horizontally into the oral cavity of a patient an elongated flat thin plate of a device having vertically adjustable upper and lower transverse frenum bars adjusted so that uppermost and lowermost edges of said bars respectively engage the upper and lower mucco-labial folds of said cavity with the lips of the patient resting normally on said plate, and in determining the distances between said plate and the uppermost and lowermost edges of said bars.

4. An apparatus for obtaining the extra-oral measurements of the vertical heights of the upper and lower dental arches of an edentulous person comprising, a horizontally disposed labial plate having an outer end portion for manual engagement and an inner end portion for insertion into the oral cavity of the person and an intermediate portion for engagement by the lips of the person, separate vertically-disposed guideways extending through said labial plate intermediate its outer and inner end portions, vertically-disposed upper and lower supports independently slidably adjustable in said separate guideways, a horizontally-disposed superior labial frenum bar fixed to said upper support for embracement against the upper lip of the person, a horizontally-disposed inferior labial frenum bar fixed to said lower support for embracement against the lower lip of the person, said frenum bars being of arcuate configuration complemental to the exterior facial structure of the normal upper and lower lips and being provided with notches on the outermost edges thereof for centering alignment relative to the exterior facial features of the patient, said supports being provided with measuring means registrable with said labial plate for indicating the position of said frenum bars relative to said labial plate.

5. An apparatus for obtaining a measurement of the vertical height of the upper dental arch of an edentulous person comprising, a horizontally disposed labial plate having an outer end portion for manual engagement and an inner end portion for insertion into the oral cavity of the person and an intermediate portion for engagement by the lips of the person, a vertically-disposed guideway extending through said labial plate adjacent the intermediate portion thereof, a vertically-disposed support slidably adjustable in said guideway and relative to said labial plate, a horizontally-disposed superior labial frenum bar fixed to the upper end of said support for embracement against the facial structure upwardly of the mouth of the person, said frenum bar being of arcuate configuration complemental to the facial structure upwardly of the mouth of the person and being provided with a notch on the uppermost edge for centering alignment relative to the facial structure of the patient, said support being provided with measuring means registrable with said labial plate for indicating the position of said frenum bar relative to said labial plate.

6. An apparatus for obtaining a measurement of the vertical height of the lower dental arch of an edentulous person comprising, a horizontally-disposed labial plate having an outer end portion for manual engagement and an inner end portion for insertion into the oral cavity of the person and an intermediate portion for engagement by the lips of the person, a vertically-disposed guideway extending through said labial plate adjacent the intermediate portion thereof, a vertically-disposed support slidably adjustable in said guideway and relative to said labial plate, a horizontally-disposed inferior labial frenum bar fixed to the lower end of said support for embracement adjacent the facial structure downwardly of the mouth of the person, said frenum bar being of arcuate configuration complemental to the facial structure downwardly of the mouth of the person and being provided with a notch on the lowermost edge for centering alignment relative to the facial structure of the patient, said support being provided with measuring means registrable with said labial plate for indicating the position of said frenum bar relative to said labial plate.

References Cited in the file of this patent

UNITED STATES PATENTS

| | | |
|---|---|---|
| 252,785 | Manker | Jan. 24, 1882 |
| 1,888,416 | Dalbey | June 27, 1916 |
| 1,589,973 | Landa | June 22, 1926 |
| 1,662,670 | Harter | Mar. 13, 1928 |
| 1,751,833 | Millar | Mar. 25, 1930 |
| 2,154,148 | Butts | Apr. 11, 1939 |
| 2,566,903 | Moran | Sept. 4, 1951 |

FOREIGN PATENTS

| | | |
|---|---|---|
| 537,025 | Germany | Oct. 29, 1931 |